United States Patent
Morioka (10) Patent No.: US 12,495,782 B2
(45) Date of Patent: Dec. 16, 2025

(54) REEL SEAT

(71) Applicant: GLOBERIDE, INC., Higashikurume (JP)

(72) Inventor: Toshiki Morioka, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/911,547

(22) Filed: Oct. 10, 2024

(65) Prior Publication Data

US 2025/0228221 A1 Jul. 17, 2025

(30) Foreign Application Priority Data

Jan. 12, 2024 (JP) .................................. 2024-003525

(51) Int. Cl.
*A01K 87/06* (2006.01)

(52) U.S. Cl.
CPC .................................... *A01K 87/06* (2013.01)

(58) Field of Classification Search
CPC ..................................................... A01K 87/06
See application file for complete search history.

(56) References Cited

U.S. PATENT DOCUMENTS

| 2024/0147977 | A1* | 5/2024 | Omura | .................. | A01K 87/08 |
| 2025/0064039 | A1* | 2/2025 | Omura | .................. | A01K 87/06 |

FOREIGN PATENT DOCUMENTS

| JP | 2023-170992 A | 12/2023 | | |
| KR | 20250028957 A | * | 3/2025 | ............. A01K 87/06 |

* cited by examiner

*Primary Examiner* — Richard G Davis
(74) *Attorney, Agent, or Firm* — Oliff PLC (57) ABSTRACT

A reel seat comprises a reel seat main body comprising a fixed hood into which one end of a mounting leg portion is inserted, and a floating hood attached movably in an axial direction with respect to the reel seat main body and into which the other end of the mounting leg portion is inserted. The reel seat comprises placement surfaces provided on the reel seat main body and on which the mounting leg portion is placed, and protrusion portions formed so as to protrude in a circumferential direction from both side edges of the placement surfaces when viewed in the axial direction of the reel seat main body. The protrusion portions extend in the axial direction at portions touched by fingers when being gripped together with the mounting leg portion.

3 Claims, 9 Drawing Sheets

REEL SEAT

CROSS-REFERENCE TO RELATED APPLICATION

This application claims priority under 35 U.S.C. § 119 to Japanese Patent Application No. 2024-003525 filed on Jan. 12, 2024 in the Japanese Patent Office, the entire contents of each hereby incorporated by reference.

BACK GROUND OF THE INVENTION

1. Technical Field

The present invention relates to a reel seat for fixing a fishing spinning reel.

2. Description of the Related Art

JP 2023-170992 A discloses an invention related to a reel seat for fixing a fishing spinning reel. The reel seat according to JP 2023-170992 A includes a reel seat main body having a fixed hood, a floating hood movable in an axial direction with respect to the reel seat main body, and a placement surface on which a mounting leg portion of a fishing spinning reel is placed. By placing the mounting leg portion of the fishing spinning reel on the placement surface and clamping or releasing the mounting leg portion between the fixed hood and the floating hood, the fishing spinning reel can be attached to and detached from the reel seat.

In the reel seat of JP 2023-170992 A, a thumb is put on an upper portion of the reel seat main body, and the mounting leg portion of the fishing spinning reel and the reel seat are gripped with an index finger, a middle finger, a ring finger, and a little finger. As a result, the mounting leg portion of the fishing spinning reel and the reel seat can be strongly gripped.

SUMMARY OF THE INVENTION

In the reel seat of JP 2023-170992 A, a step is formed between the mounting leg portion of the fishing spinning reel and the reel seat main body. For this reason, when the reel seat is gripped, there is a problem that the gripping finger hits the step portion and fishing operability is poor. In particular, when gripping is performed for a long time, gripping and holding properties may be deteriorated, and thus there has been a demand for improving the gripping and holding properties.

The present invention has been made to solve the above problem, and an object of the present invention is to provide a reel seat capable of improving fishing operability and gripping and holding properties.

In order to solve the above problem, the present invention provides a reel seat to which a mounting leg portion of a fishing spinning reel is detachably fixed. The reel seat comprises: a reel seat main body comprising a fixed hood into which one end of the mounting leg portion is inserted, and a floating hood attached movably in an axial direction with respect to the reel seat main body and into which the other end of the mounting leg portion is inserted. The reel seat comprises placement surfaces provided on the reel seat main body and on which the mounting leg portion is placed, and a pair of protrusion portions formed so as to protrude in a circumferential direction from both side edges of the placement surfaces when viewed in the axial direction of the reel seat main body. The pair of protrusion portions extend in the axial direction at portions touched by fingers when being gripped together with the mounting leg portion.

According to the present invention, since a step formed between the mounting leg portion of the fishing spinning reel and the reel seat main body is reduced by the presence of the pair of protrusion portions, a sense of unity (fitting) with the mounting leg portion when gripping the reel seat is enhanced, and fishing operability is improved. In addition, since contact of the gripping fingers with respect to the step portion is reduced, the fingers are less likely to be painful even when gripping is performed for a long time, and gripping and holding properties can be improved.

In a direction orthogonal to an axis of the reel seat main body, an interval between the protrusion portions is preferably set in a range of 16.5 to 17.5 mm. Further, a protrusion height of both the protrusion portions with respect to the placement surfaces is preferably set in a range of 0.3 to 2.0 mm, respectively.

In these configurations, it is possible to improve fishing operability by reducing the step formed between the mounting leg portion and the reel seat main body while suitably placing the mounting leg portion of small and medium fishing spinning reels having high versatility on the placement surfaces. In addition, it is possible to improve gripping and holding properties when gripping is performed for a long time.

In addition, it is preferable that both the protrusion portions are formed along the placement surfaces, and the protrusion height of both the protrusion portions from the placement surfaces is lower at a central portion in the axial direction than at one end side and the other end side in the axial direction. In this case, the protrusion height of both the protrusion portions from the placement surfaces at the central portion in the axial direction is preferably 0.3 mm.

With this configuration, since the protrusion portions are formed over the placement surfaces, the step formed can be reduced over the entire mounting leg portion. Therefore, it is possible to improve fishing operability and gripping and holding properties. In addition, since the protrusion height of both the protrusion portions with respect to the placement surfaces is lower at the central portion in the axial direction than at one end side and the other end side in the axial direction, the mounting leg portion can be suitably placed on the placement surfaces even when the central portion in a front-rear direction of the mounting leg portion is slightly expanded in a direction orthogonal to the axis of the reel seat main body. Therefore, it is possible to improve fishing operability and gripping and holding properties.

It is preferable that a groove-shaped lightening portion is formed inside both the protrusion portions, and the placement surfaces are formed at two positions of the one end side and the other end side in the axial direction across the lightening portion.

With this configuration, the placement surfaces having a simple configuration formed at two positions in the front and rear of the one end side and the other end side in the axial direction allow the mounting leg portion to be placed and fixed in a stable state. In addition, the lightening portion makes it possible to achieve weight reduction of the reel seat main body. This contributes to improvement of fishing operability.

It is preferable that a hollow portion is formed inside both the protrusion portions, and a thickness of both the protrusion portions is set in a range of 0.6 to 1.0 mm.

With this configuration, it is possible to achieve further weight reduction of the reel seat main body while securing strength of both the protrusion portions. This makes it possible to improve fishing operability.

According to the present invention, it is possible to improve fishing operability and gripping and holding properties.

DETAILED DESCRIPTION

Hereinafter, a reel seat according to embodiments of the present invention will be described in detail with reference to the drawings. In the embodiments, the same portions are denoted by the same reference numerals, and redundant description will be omitted. Note that "up and down", "left and right", and "front and rear" follow the arrows in FIG. 2. A rod tip side is "front", and a rod base side is "rear". In the following description, the present invention is applied to an uplock-type reel seat in which a floating hood (movable hood) is moved from the rear side to the front side to clamp a mounting leg portion. However, the present invention is applicable to a downlock-type reel seat in which the front and rear of the reel seat are reversed, and the floating hood (movable hood) is moved from the front side to the rear side to clamp the mounting leg portion.

First Embodiment

Figure 1:
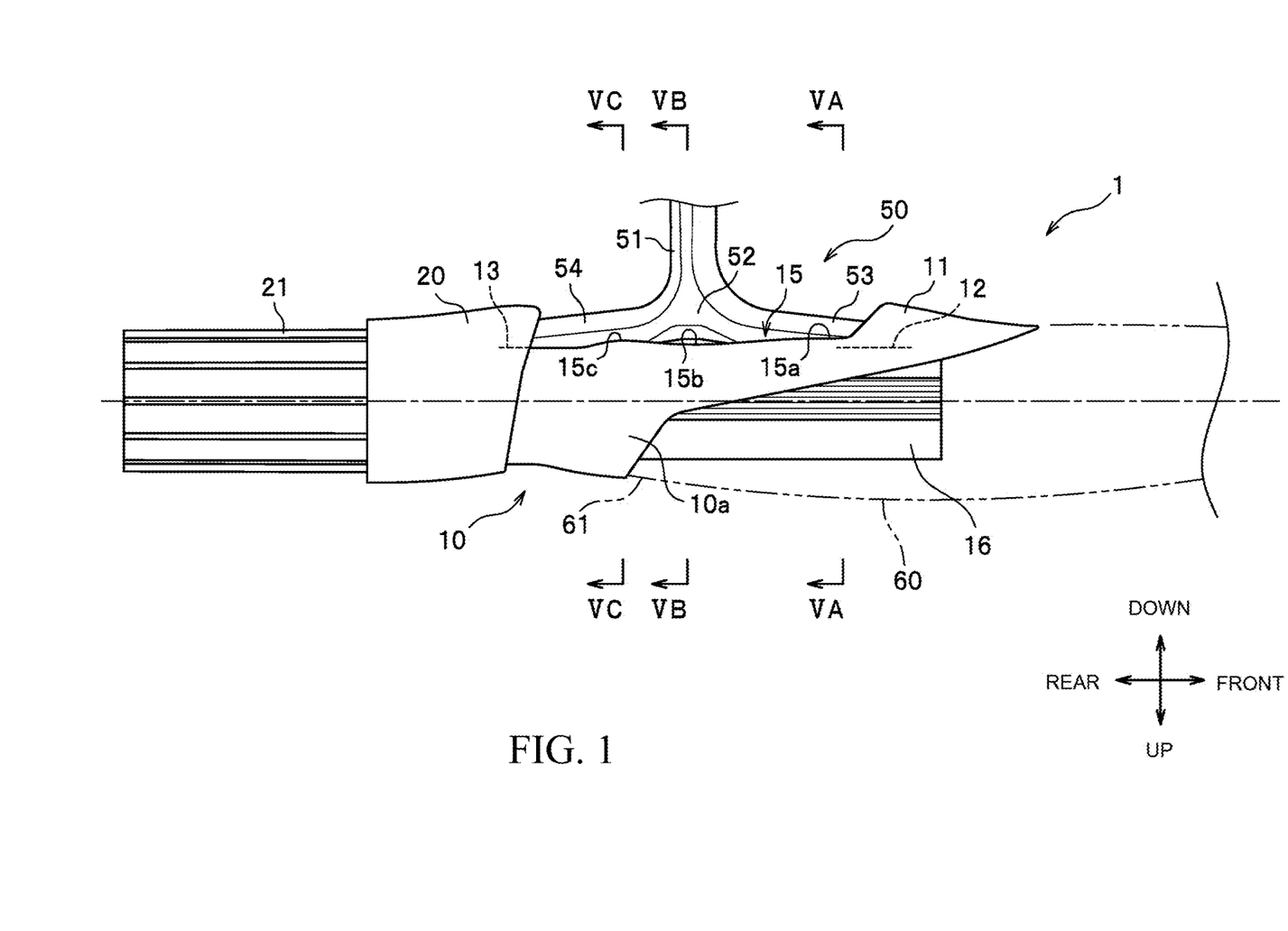
FIG. 1 is a view illustrating a reel seat according to a first embodiment of the present invention, and is a side view of a state in which a mounting leg portion is fixed to placement surfaces in an upside down manner.

As illustrated in FIG. 1, a reel seat 1 according to the present embodiment is a tubular member to which a mounting leg portion 50 of a fishing spinning reel is detachably fixed. A rod (not illustrated) is inserted into a hollow portion 1a (see FIG. 5A) inside of the reel seat 1 and fixed by adhesion.

The reel seat 1 comprises a reel seat main body 10 and a floating hood 20 that is attached to the reel seat main body 10 so as to be movable in an axial direction. The reel seat main body 10 is made of a synthetic resin, and comprises a fixed hood 11, front placement surfaces 12, rear placement surfaces 13, and protrusion portions 15 and 15.

Figure 5A:
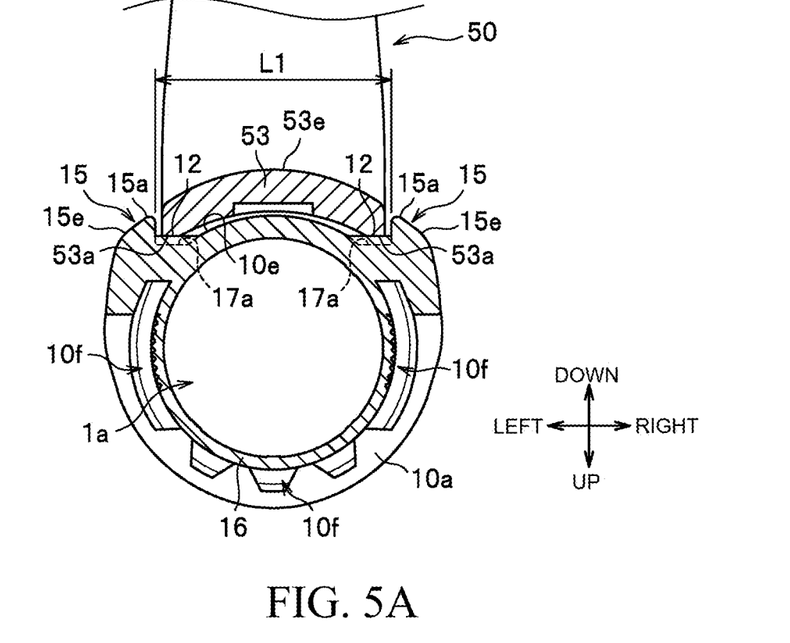
FIG. 5A is an enlarged cross-sectional view taken along line VA-VA in FIG. 1.
Figure 5B:
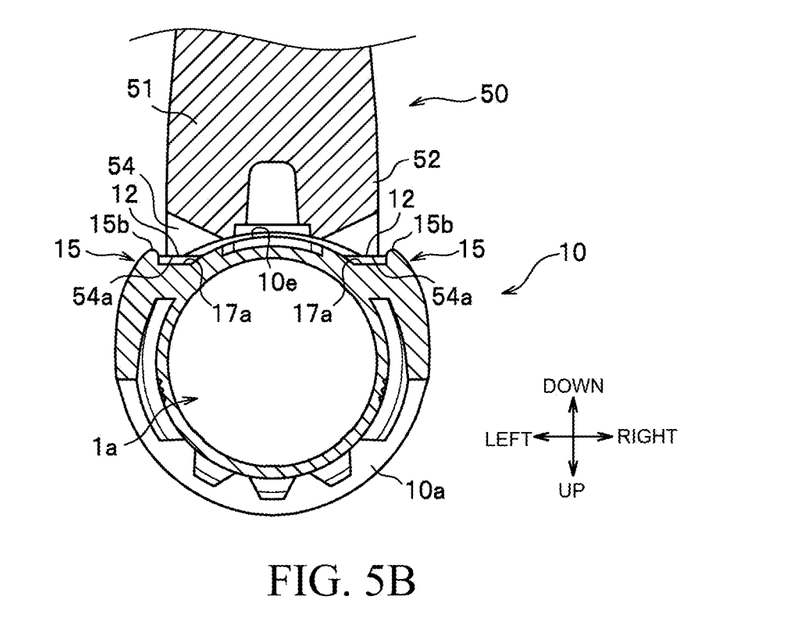
FIG. 5B is an enlarged cross-sectional view taken along line VB-VB of FIG. 1.
Figure 5C:
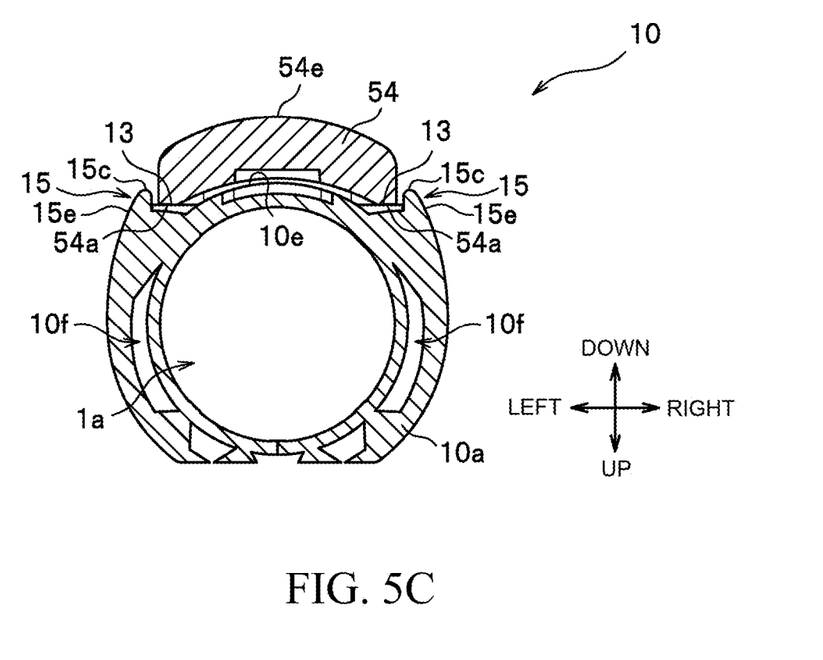
FIG. 5C is an enlarged cross-sectional view taken along line VC-VC in FIG. 1.

The fixed hood 11 is integrally formed at a lower portion of a front portion of the reel seat main body 10. The fixed hood 11 is a portion into which a front portion 53, which is one end of the mounting leg portion 50, is inserted. A substantially cylindrical grip mounting portion 16 for mounting a grip 60 is integrally formed on an upper portion of the fixed hood 11. A rear end of the grip 60 is in contact with a front surface of a bulging portion 10a extending rearward from the fixed hood 11. The bulging portion 10a is a portion bulging in a substantially arc shape in an upper portion of the reel seat main body 10. As illustrated in FIGS. 5A to 5C, gaps 10f contributing to weight reduction are formed inside the bulging portion 10a. Note that the grip 60 has a substantially cylindrical shape, and is a portion to which fingers contact. The grip 60 is formed of a flexible member such as cork or an ethylene vinyl acetate copolymer (EVA) made of a foamable resin.

The floating hood 20 is a portion that is mounted to a rear portion of the reel seat main body 10 and into which a rear portion 54 serving as the other end of the mounting leg portion 50 is inserted. The floating hood 20 is screwed into a screw portion 10c (see FIG. 2) engraved in the rear portion of the reel seat main body 10 to be movable in a front-rear direction. A knob portion 21 is provided at a rear portion of the floating hood 20. By moving the floating hood 20 in a front direction while rotating the knob portion 21, the mounting leg portion 50 can be clamped and fixed with the fixed hood 11 therebetween. Further, by moving the floating hood 20 in a rear direction while rotating the knob portion 21, the clamping of the mounting leg portion 50 can be released and removed.

Figure 2:
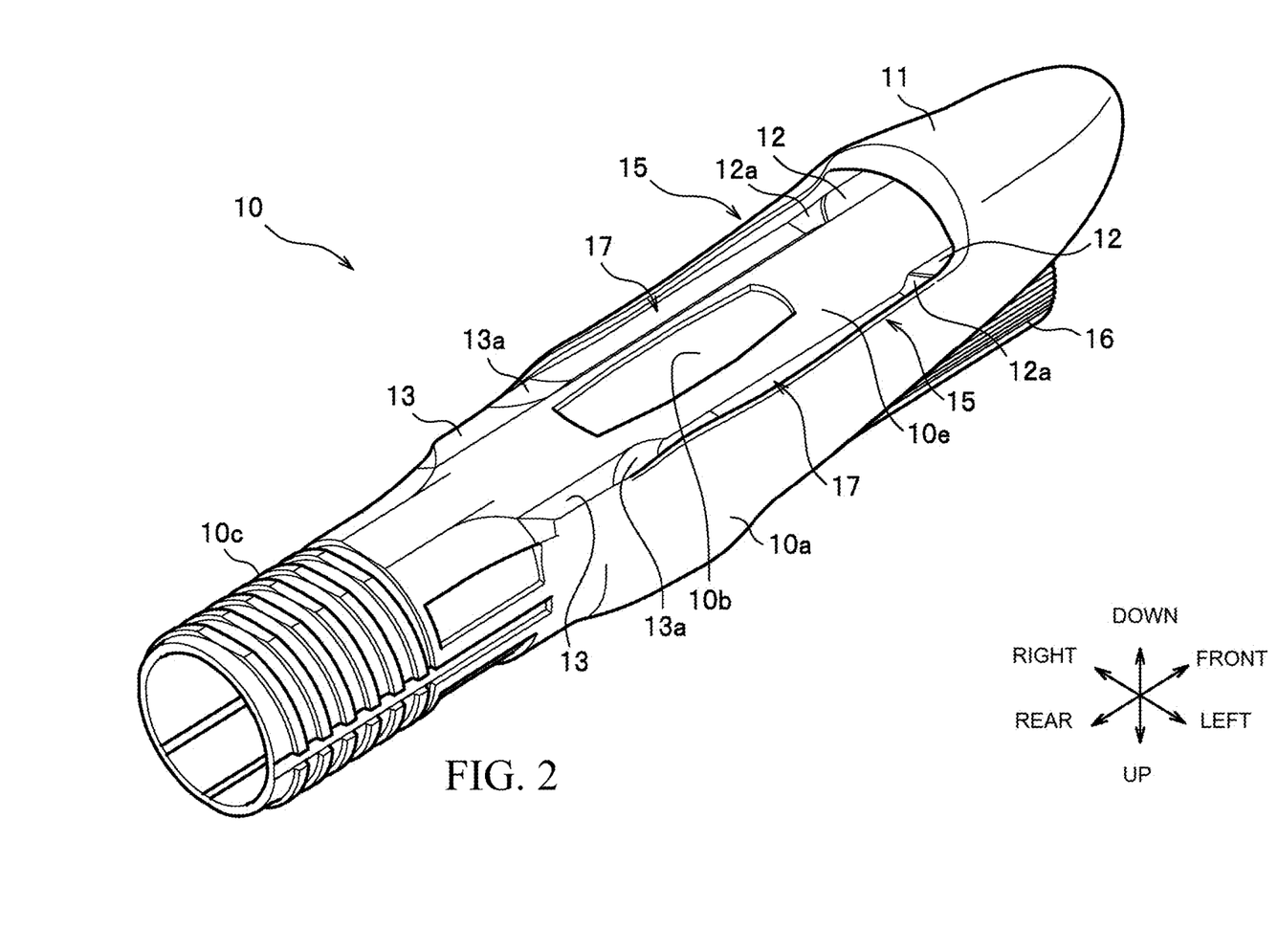
FIG. 2 is a perspective view illustrating a reel seat main body similarly in an upside down manner.
Figure 3A:
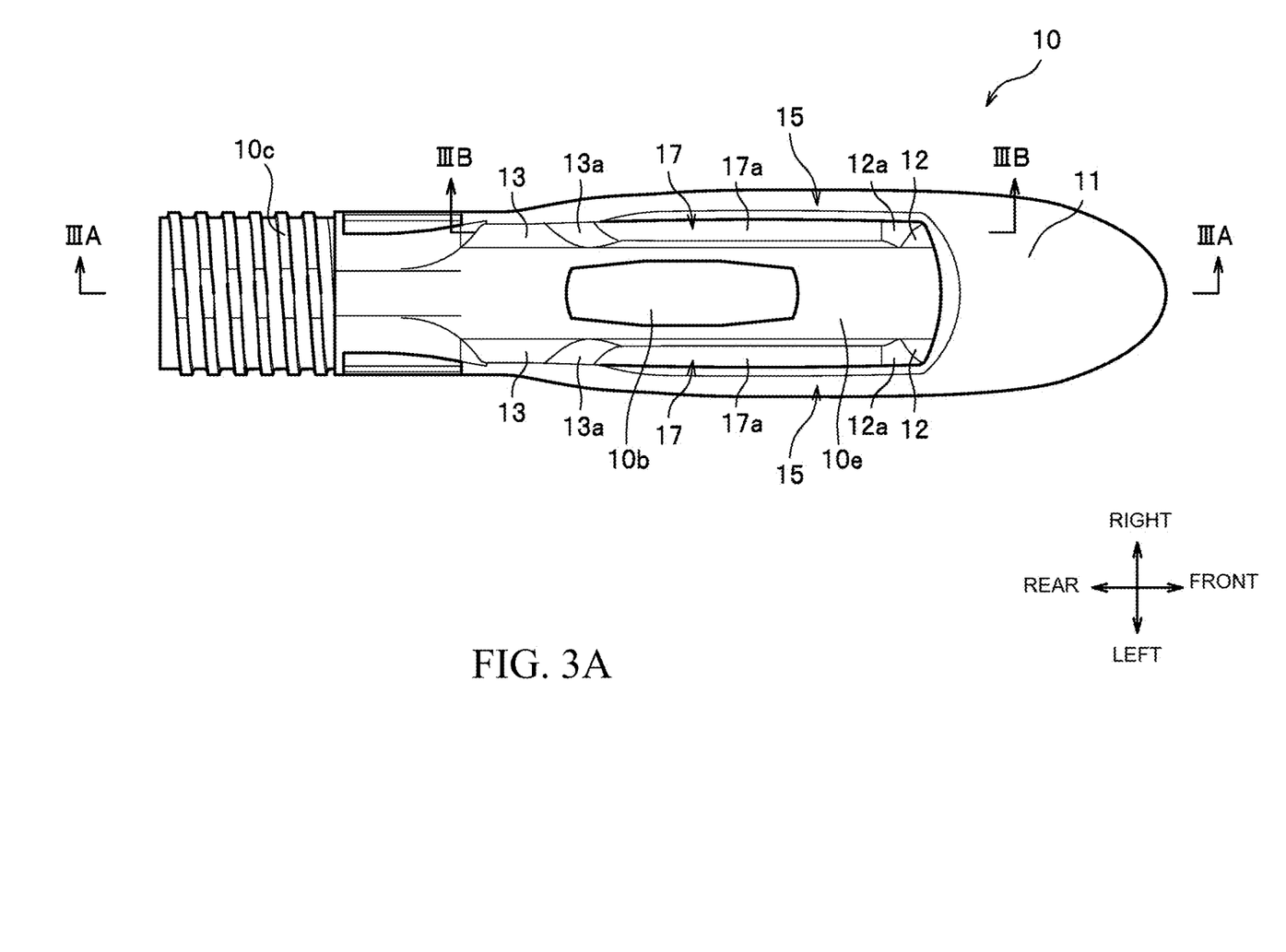
FIG. 3A is a bottom view of the reel seat main body.
Figure 3B:
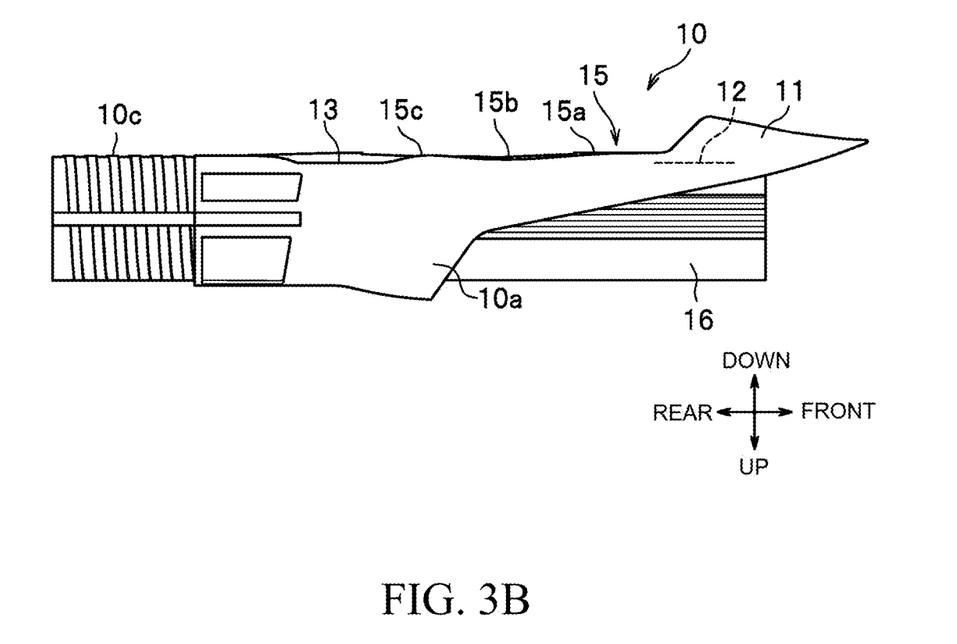
FIG. 3B is a side view of the reel seat main body corresponding to the bottom view of FIG. 3A.
Figure 4A:
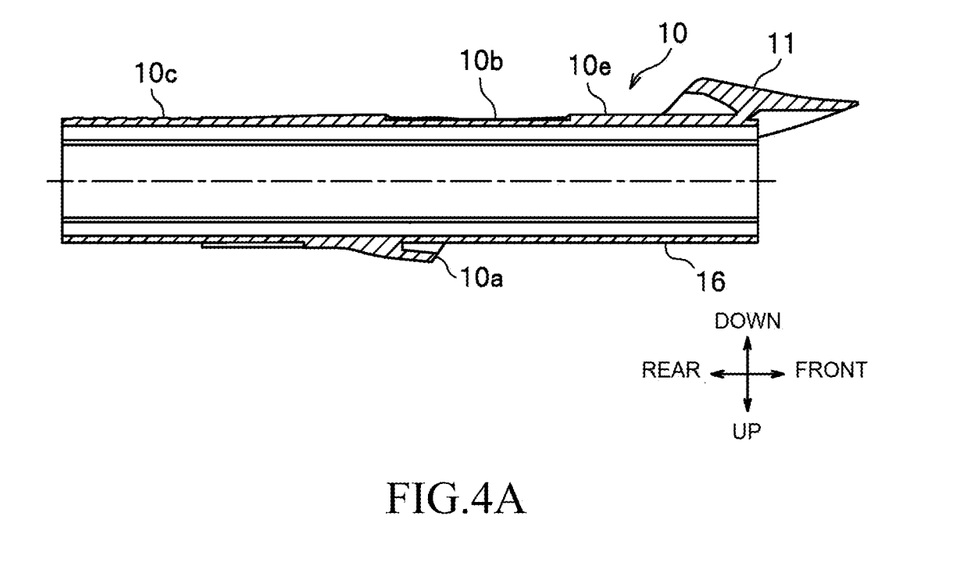
FIG. 4A is a cross-sectional view taken along line IIIA-IIIA in FIG. 3A.
Figure 4B:
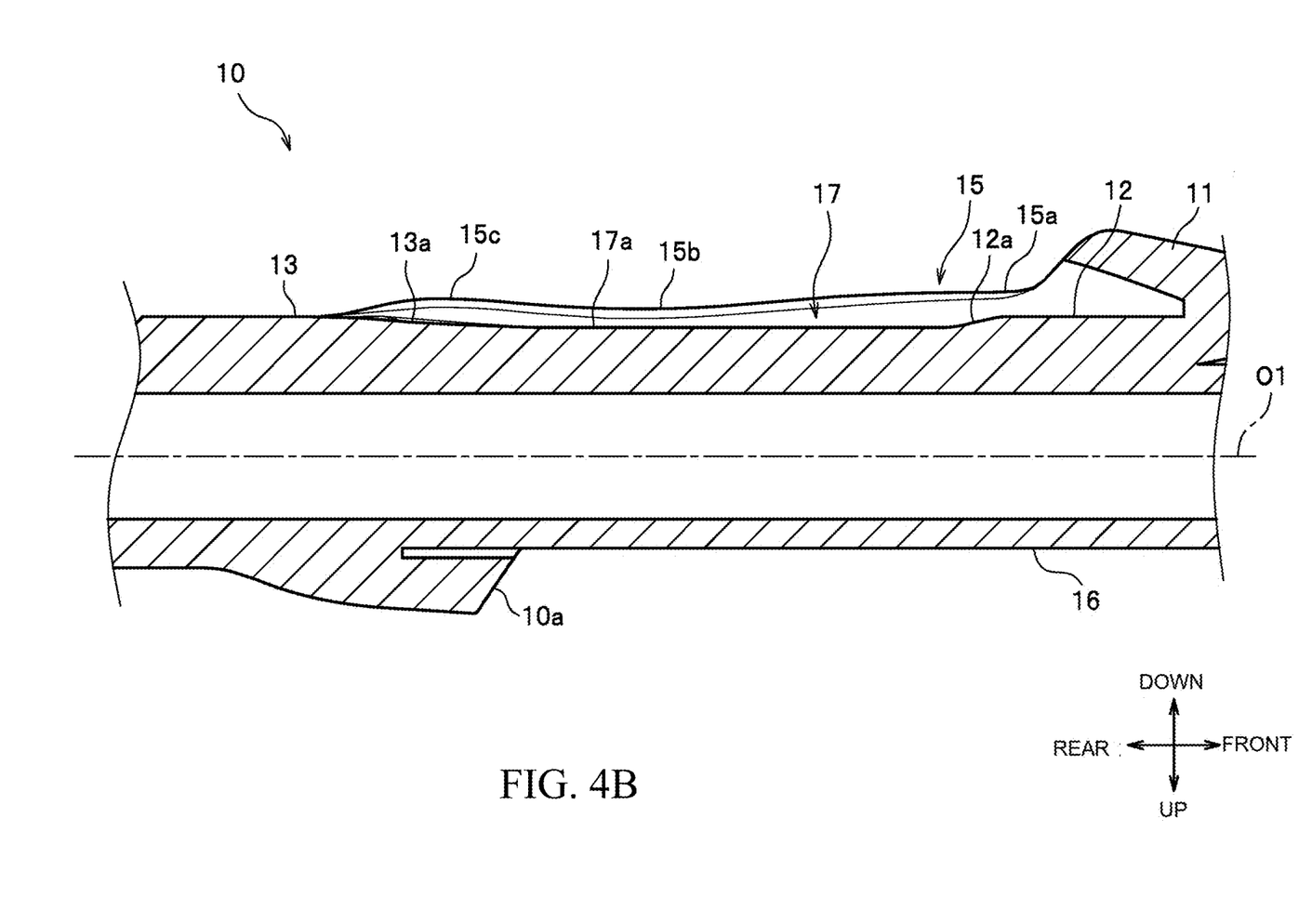
FIG. 4B is a cross-sectional view taken along line IIIB-IIIB in FIG. 3A.

As illustrated in FIGS. 2, 3A, and 3B, the front placement surfaces 12 and the rear placement surfaces 13 are flat surfaces on which the mounting leg portion 50 is placed, and are formed at two positions in the front and rear of the reel seat main body 10. As illustrated in FIG. 4B, the front placement surfaces 12 and the rear placement surfaces 13 are disposed at equal distances from a central axis O1 of the reel seat main body 10. As illustrated in FIG. 5A, contact surfaces 53a and 53a formed on both left and right side portions of the front portion 53 of the mounting leg portion 50 are placed on the front placement surfaces 12. On the other hand, as illustrated in FIG. 5B, contact surfaces 54a and 54a formed on both left and right side portions of the rear portion 54 of the mounting leg portion 50 are placed on the rear placement surfaces 13. A lower surface 10e of the reel seat main body 10 is formed in a curved convex shape in cross section following curved concave shapes in cross section of the front portion 53 and the rear portion 54 of the mounting leg portion 50. The lower surface 10e of the reel seat main body 10 faces facing surfaces of the front portion 53 and the rear portion 54 of the mounting leg portion 50 with a slight gap therebetween, but may be in contact with the facing surfaces. As illustrated in FIGS. 2, 3A, and 4A, a recess 10b to which a decorative part is attached is formed on the lower surface 10e.

Figure 6:
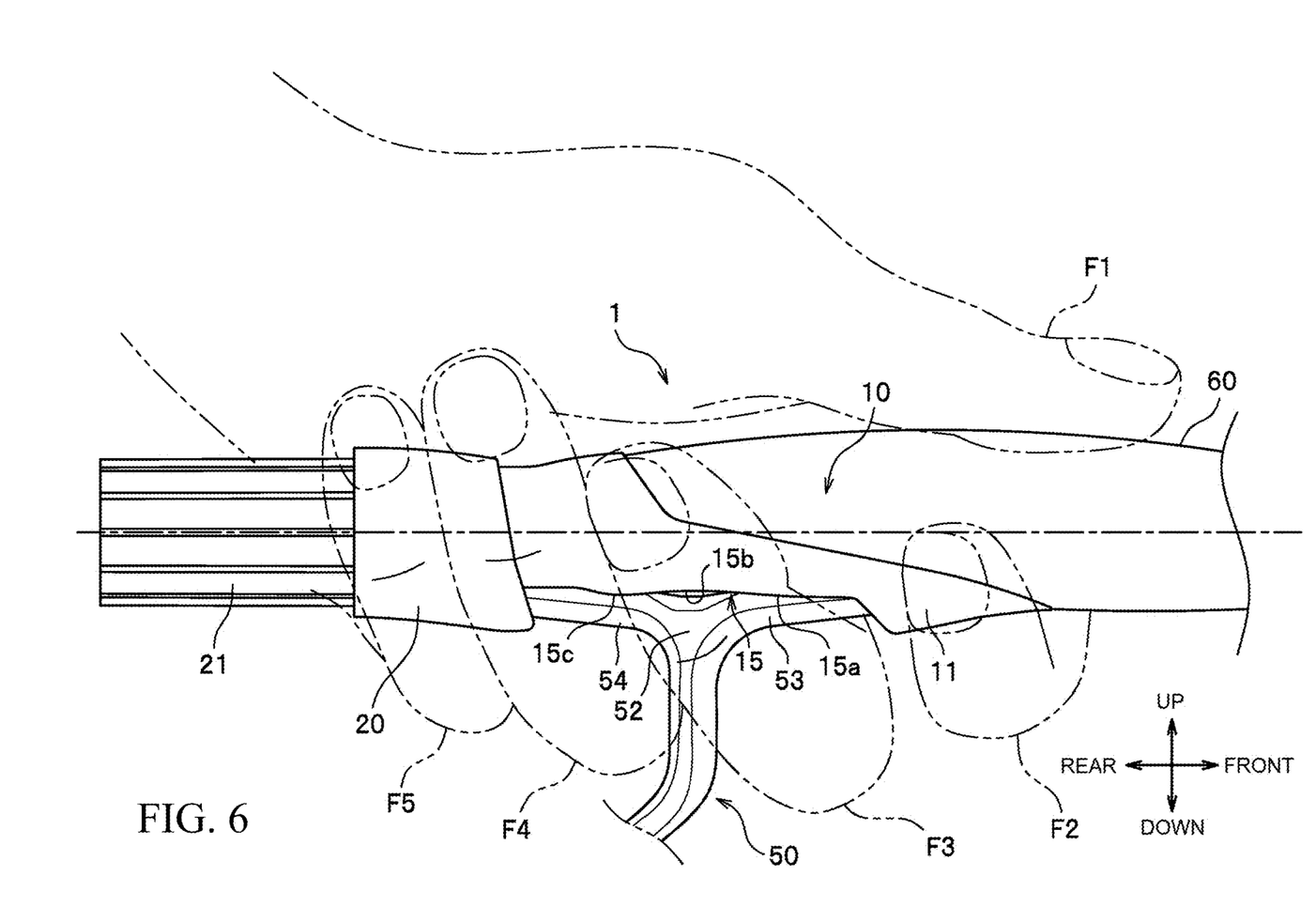
FIG. 6 is a side view illustrating a state of being gripped with fingers during use.

As illustrated in FIGS. 2 and 5A to 5C, the protrusion portions 15 and 15 are formed at symmetrical positions as viewed in the axial direction of the reel seat main body 10. As illustrated in FIGS. 5A to 5C, the protrusion portions 15 and 15 respectively protrude in a circumferential direction continuously to both side edges which become radially outer sides of the front placement surfaces 12 and the rear placement surfaces 13, respectively, and have a substantially triangular shape in cross section in which apexes which become protruding ends are formed in a round shape. As illustrated in FIG. 6, the protrusion portions 15 and 15 extend in the axial direction at portions touched by fingers when being gripped together with the mounting leg portion 50.

An interval L1 between the protrusion portions 15 and 15 may be appropriately set, but in the present embodiment, as illustrated in FIG. 5A, the interval L1 is set in a range of 16.5 to 17.5 mm in a direction (left-right direction) orthogonal to an axis of the reel seat main body 10. The interval L1 corresponds to a width dimension in the left-right direction of the mounting leg portion 50 of a general small or medium fishing spinning reel.

As illustrated in FIG. 5A, in a state where the front portion 53 of the mounting leg portion 50 is placed on the front placement surfaces 12, outer surfaces 15e and 15e of the protrusion portions 15 and 15 and an outer surface 53e of the front portion 53 form substantially curved (substantially arcuate) surfaces continuous with each other. Similarly, as illustrated in FIG. 5C, in a state where the rear portion 54 of the mounting leg portion 50 is placed on the rear placement surfaces 13, the outer surfaces 15e and 15e of the protrusion portions 15 and 15 and an outer surface 54e of the rear portion 54 form substantially curved (substantially arcuate) surfaces continuous with each other. These substantially curved surfaces serve as gripping surfaces touched by fingers when being gripped together with the mounting leg portion 50.

Next, the shape of the protrusion portions 15 and 15 in a left and right side view will be described. Since the left and right protrusion portions 15 and 15 are the same, a right protrusion portion 15 will be described as an example here. As illustrated in FIG. 4B, the protrusion portion 15 is formed from the front placement surface 12 to the rear placement surface 13, and has a wave shape having a height difference in the front-rear direction. The protrusion portion 15 comprises a front crest portion 15a and a rear crest portion 15c formed to have a high protrusion height from the front placement surface 12 and the rear placement surface 13, and a valley portion 15b formed to have a protrusion height lower than those of the front crest portion and the rear crest portion. In the present embodiment, the front crest portion 15a on the front side of the protrusion portion 15 is formed somewhat higher than the rear crest portion 15c.

Here, the protrusion height of the protrusion portion 15 from the front placement surface 12 and the rear placement surface 13 may be appropriately set, but is set in a range of 0.3 to 2.0 mm as a whole in the present embodiment. On the other hand, the valley portion 15b is formed at a position that is substantially the central portion of the front placement surface 12 and the rear placement surface 13 in the front-rear direction. The valley portion 15b corresponds to a central portion 52 of the mounting leg portion 50 in the front-rear direction (see FIG. 1). The protrusion height of the valley portion 15b from the front placement surface 12 and the rear placement surface 13 may be appropriately set, but is set to 0.3 mm in the present embodiment.

As illustrated in FIGS. 5A to 5C, such protrusion portions 15 partially cover the left and right side surfaces of the mounting leg portion 50 from the side, respectively, and reduce exposure of the left and right side surfaces of the mounting leg portion 50 to contribute to formation of the gripping surfaces described above. The central portion 52 (FIGS. 1 and 6) of the mounting leg portion 50 corresponding to the valley portion 15b can avoid interference when the mounting leg portion 50 of a model bulging in the left-right direction is mounted.

As illustrated in FIGS. 2 and 3A, lightening portions 17 are formed inside the protrusion portions 15 and 15, respectively. That is, the front placement surface 12 and the rear placement surface 13 are disposed on the front side that is one end side and the rear side that is the other end side across the lightening portions 17 and 17. The lightening portions 17 and 17 extend in a groove shape in the front-rear direction along the protrusion portions 15 and 15, and are recessed with respect to the front placement surfaces 12 and the rear placement surfaces 13. Bottom surfaces 17a of the lightening portions 17 are continuous with the front placement surfaces 12 via front inclined surfaces 12a, respectively. Similarly, the bottom surfaces 17a are continuous with the rear placement surfaces 13 via rear inclined surfaces 13a, respectively. The front inclined surfaces 12a and the rear inclined surfaces 13a function as guide parts that suppress catching of the mounting leg portion 50 and guide the mounting leg portion 50 so that the placement is smoothly performed when the mounting leg portion 50 is placed on the front placement surfaces 12 and the rear placement surfaces 13.

Next, gripping of the reel seat 1 will be described with reference to FIG. 6. As illustrated in FIG. 6, in use, for example, a thumb F1 is brought into contact with an upper portion of the grip 60, and the reel seat main body 10 and the floating hood 20 are gripped by an index finger F2, a middle finger F3, a ring finger F4, and a little finger F5 so as to wrap them together with the mounting leg portion 50.

In this case, by bringing the middle finger F3 into contact with the front portion 53 of the mounting leg portion 50 so as to wrap around it from the lower surface side, a portion from a front portion side to a central portion side of the reel seat main body 10 can be clamped from a lower direction and the left-right direction. At this time, the front crest portions 15a of the protrusion portions 15 of the reel seat main body 10 form a continuous and substantially curved gripping surface at a portion touched by the middle finger F3 (see FIG. 5A). As a result, steps formed between the left and right side surfaces of the front portion 53 of the mounting leg portion 50 and the both side surfaces of the reel seat main body 10 are reduced by the presence of the front crest portions 15a of the protrusion portions 15, respectively.

Further, by bringing the ring finger F4 into contact with the rear portion 54 of the mounting leg portion 50 so as to wrap around it from the lower surface side, the rear portion side portion of the reel seat main body 10 can be clamped from the lower direction and the left-right direction. At this time, the rear crest portions 15c of the protrusion portions 15 of the reel seat main body 10 form a continuous and substantially curved gripping surface at a portion touched by the ring finger F4 (see FIG. 5C). As a result, steps formed between the left and right side surfaces of the rear portion 54 of the mounting leg portion 50 and the both side surfaces of the reel seat main body 10 are reduced by the presence of the rear crest portions 15c of the protrusion portions 15, respectively. Note that in a case where another finger touches the front crest portions 15a or the rear crest portions 15c of the protrusion portions 15 by changing the gripping method, the operation and effect are the same.

According to the reel seat 1 of the present embodiment described above, since the steps formed between the mounting leg portion 50 and the reel seat main body 10 are reduced by the presence of both the protrusion portions 15 and 15 (front crest portions 15a and rear crest portions 15c), a sense of unity (fitting) with the mounting leg portion 50 when the reel seat main body 10 is gripped is enhanced, and fishing operability is improved. In addition, since the contact of the gripping fingers with respect to the step portion is reduced, the fingers are less likely to be painful even when gripping is performed for a long time, and gripping and holding properties can be improved.

The interval between the protrusion portions 15 and 15 is set to a range of 16.5 to 17.5 mm, and the protrusion height of the protrusion portions 15 with respect to the front placement surfaces 12 and the rear placement surfaces 13 is set to a range of 0.3 to 2.0 mm. As a result, it is possible to improve the fishing operability by reducing the step formed between the mounting leg portion 50 and the reel seat main body 10 while suitably placing the mounting leg portion 50 of the small and medium fishing spinning reel having high versatility on the front placement surfaces 12 and the rear placement surfaces 13. In addition, it is possible to improve gripping and holding properties when gripping is performed for a long time.

Since both the protrusion portions 15 and 15 are formed over the front placement surfaces 12 and the rear placement surfaces 13, the step formed can be reduced over the entire mounting leg portion 50. Therefore, it is possible to improve fishing operability and gripping and holding properties.

In addition, the protrusion height of both the protrusion portions 15 and 15 with respect to the front placement surfaces 12 and the rear placement surfaces 13 is lower at the valley portion 15*b*, which is the central portion in the axial direction, than at the front side (one end side) and the rear side (the other end side) in the axial direction. Accordingly, even in the case of a model in which the central portion 52 of the mounting leg portion 50 slightly bulges in the direction (left-right direction) orthogonal to the axis of the reel seat main body 10, the mounting leg portion 50 can be suitably mounted without interfering with the model. Therefore, it is possible to improve fishing operability and gripping and holding properties.

Further, the mounting leg portion 50 can be mounted and fixed in a stable state by a simple configuration using the front placement surfaces 12 and the rear placement surfaces 13. In addition, the lightening portion 17 makes it possible to achieve weight reduction of the reel seat main body 10. This contributes to improvement in the fish fishing operability, and eventually, improvement in the gripping and holding properties.

Second Embodiment

Figure 7:
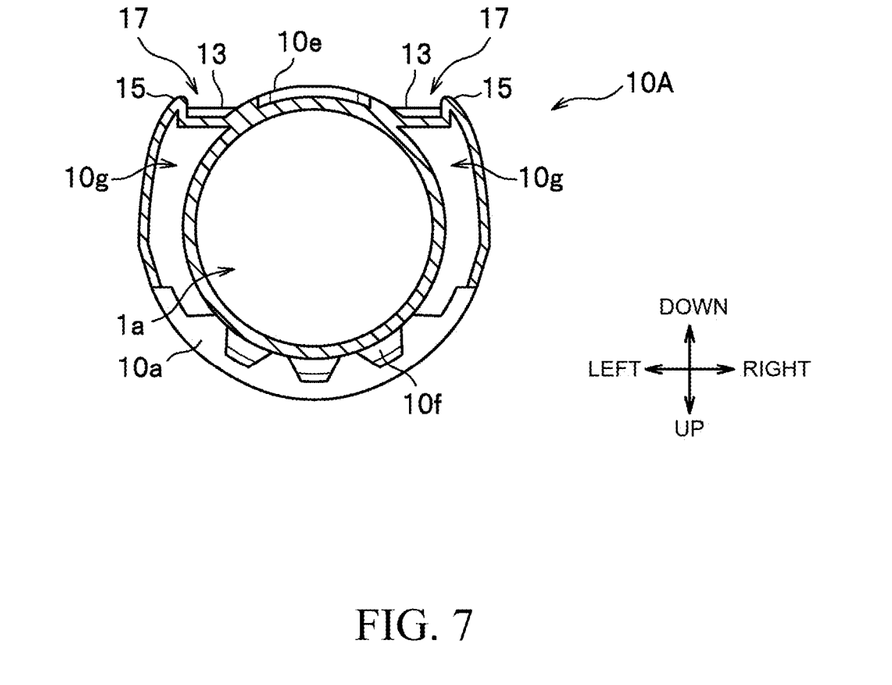
FIG. 7 is an enlarged cross-sectional view illustrating a reel seat main body of a reel seat according to a second embodiment of the present invention.

FIG. 7 is a cross-sectional view illustrating a reel seat main body 10A of a reel seat according to a second embodiment of the present invention. The present embodiment is different from the first embodiment in that hollow portions 10*g* and 10*g* are provided inside of protrusion portions 15 and 15 of the reel seat main body 10A.

As illustrated in FIG. 7, the hollow portions 10*g* and 10*g* are formed over substantially the entire inside of the bulging portion 10*a* of the reel seat main body 10A, and are formed such that parts of the hollow portions enter the inside of the protrusion portions 15 and 15. As a result, the protrusion portions 15 and 15 comprise a hollow shape in cross section with lightening.

Here, the thickness of each of the protrusion portions 15 and 15 is set in a range of 0.6 to 1.0 mm. That is, the protrusion portions 15 and 15 have predetermined strength while having a structure comprising the hollow portions 10*g* and 10*g* therein. Note that the hollow portions 10*g* and 10*g* may be formed only inside of the protrusion portions 15 and 15. A size of each of the hollow portions 10*g* and 10*g* in the bulging portion 10*a* can be appropriately set.

According to the present embodiment, the same operation and effect as those of the first embodiment can be obtained. In addition, according to the present embodiment, it is possible to achieve further weight reduction of the reel seat main body 10A while securing the strength of the protrusion portions 15 and 15. As a result, it is possible to improve the fishing operability, and eventually, it is possible to improve the gripping and holding properties.

Third Embodiment

Figure 8:
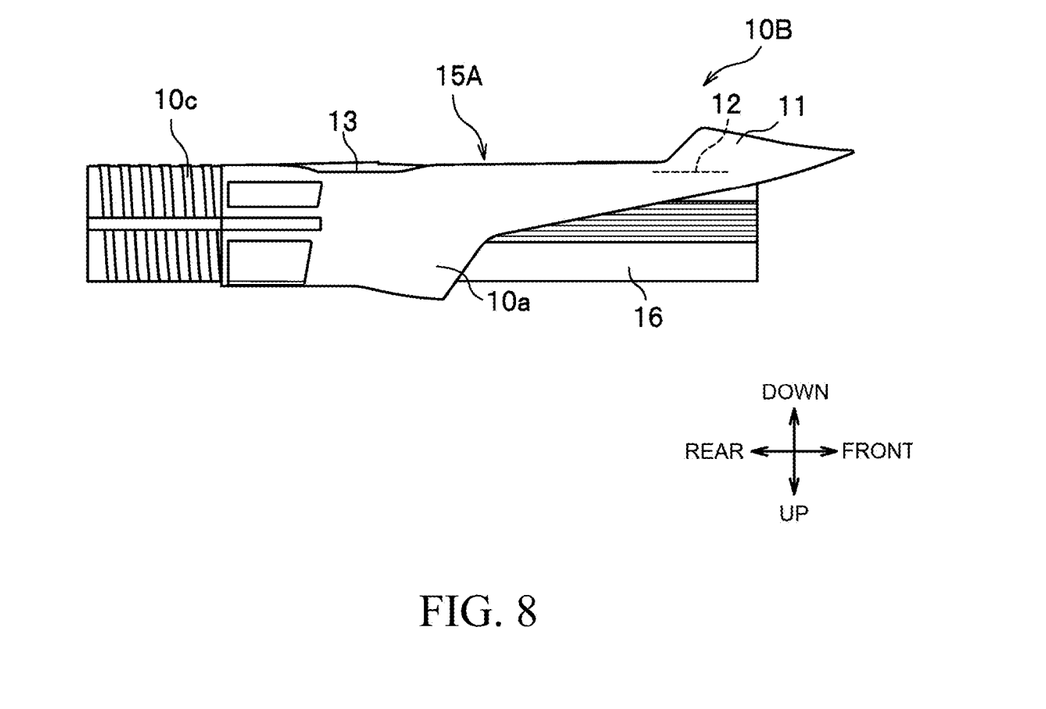
FIG. 8 is a side view illustrating a reel seat main body of a reel seat according to a third embodiment of the present invention in an upside down manner.

FIG. 8 is a side view illustrating a reel seat main body 10B of a reel seat according to a third embodiment of the present invention in an upside down manner. The present embodiment is different from the first and second embodiments in that protrusion portions 15A and 15A (only one is illustrated in FIG. 8) of the reel seat main body 10B are linearly formed.

As illustrated in FIG. 8, the protrusion portions 15A and 15A extend at a constant height in the front-rear direction with reference to the front placement surfaces 12 and the rear placement surfaces 13. The protrusion height of the protrusion portions 15A and 15A from the front placement surfaces 12 and the rear placement surfaces 13 may be appropriately set, but is set to any value in a range of 0.3 to 2.0 mm in the present embodiment. By increasing the protrusion height, the exposure of the left and right side surfaces of the mounting leg portion 50 can be reduced, and a sense of unity (fitting) with the mounting leg portion 50 when the reel seat main body 10B is gripped is enhanced.

According to the present embodiment, the same operation and effect as those of the first embodiment can be obtained. In addition, according to the present embodiment, since the protrusion portions 15A and 15A extend at a constant height in the front-rear direction, it is possible to reduce a step formed between the mounting leg portion 50 and the reel seat main body 10B as a whole from the front placement surfaces 12 to the rear placement surfaces 13. Therefore, even when the positions of the fingers move in the front-rear direction in a case where the gripping method is changed or the like, good fishing operability and gripping and holding properties are continued.

Although the embodiments of the present invention have been described above, design change can be appropriately made within a range not contradicting the gist of the present invention. For example, an example in which the protrusion portions 15 and 15 are formed from the front placement surfaces 12 to the rear placement surfaces 13 is illustrated, but the present invention is not limited thereto, and the protrusion portions 15 and 15 may be formed on at least one of the front placement surfaces 12 and the rear placement surfaces 13. Further, the protrusion portions 15 and 15 may not be formed so as to be continuous with the front placement surfaces 12 and the rear placement surfaces 13.

In addition, although an example in which the placement surfaces are formed at two positions of the front placement surfaces 12 and the rear placement surfaces 13 is illustrated, the placement surfaces may be formed at three or more positions, or may be formed so as to be continuous in the front-rear direction without the lightening portions 17 and 17.

The protrusion portions 15 and 15A may be provided only on one of the front side and the rear side of the reel seat main bodies 10, 10A, and 10B.

What is claimed is:

1. A reel seat to which a mounting leg portion of a fishing spinning reel is detachably fixed, the reel seat comprising:

a reel seat main body comprising a fixed hood into which one end of the mounting leg portion is inserted;

a floating hood attached movably in an axial direction with respect to the reel seat main body and into which another end of the mounting leg portion is inserted;

placement surfaces on the reel seat main body and on which left and right side portions of the mounting leg portion are placed; and a pair of protrusion portions that protrude in a circumferential direction from both side edges of the placement surfaces when viewed in the axial direction of the reel seat main body, wherein both the protrusion portions extend in the axial direction at portions touched by fingers when being gripped together with the mounting leg portion, both the protrusion portions are along the placement surfaces, and a protrusion height of both the protrusion portions from the placement surfaces is lower at a central portion in the axial direction than at one end side and the other end side in the axial direction, and the protrusion height of both the protrusion portions from the placement surfaces at the central portion in the axial direction is 0.3 mm.

2. A reel seat to which a mounting leg portion of a fishing spinning reel is detachably fixed, the reel seat comprising:

a reel seat main body comprising a fixed hood into which one end of the mounting leg portion is inserted;

a floating hood attached movably in an axial direction with respect to the reel seat main body and into which another end of the mounting leg portion is inserted;

placement surfaces on the reel seat main body and on which left and right side portions of the mounting leg portion are placed; and a pair of protrusion portions that protrude in a circumferential direction from both side edges of the placement surfaces when viewed in the axial direction of the reel seat main body, wherein both the protrusion portions extend in the axial direction at portions touched by fingers when being gripped together with the mounting leg portion, a groove-shaped lightening portion is inside both the protrusion portions, and the placement surfaces are at two positions of one end side and the other end side in the axial direction across the lightening portions.

3. A reel seat to which a mounting leg portion of a fishing spinning reel is detachably fixed, the reel seat comprising:

a reel seat main body comprising a fixed hood into which one end of the mounting leg portion is inserted;

a floating hood attached movably in an axial direction with respect to the reel seat main body and into which another end of the mounting leg portion is inserted;

placement surfaces on the reel seat main body and on which left and right side portions of the mounting leg portion are placed; and a pair of protrusion portions that protrude in a circumferential direction from both side edges of the placement surfaces when viewed in the axial direction of the reel seat main body, wherein both the protrusion portions extend in the axial direction at portions touched by fingers when being gripped together with the mounting leg portion, and a hollow portion is inside both the protrusion portions, and a thickness of both the protrusion portions is set in a range of 0.6 to 1.0 mm.

* * * * *